United States Patent
Burke

[15] 3,673,881
[45] July 4, 1972

[54] VARIABLE SPEED TRACTIVE TRANSMISSION

[72] Inventor: John W. Burke, 1715 Bishop Drive, Concord, Calif. 94521

[22] Filed: Feb. 3, 1971

[21] Appl. No.: 112,277

[52] U.S. Cl. .................................................. 74/198, 74/200
[51] Int. Cl. ............................................................ F16h 15/08
[58] Field of Search .................................. 74/200, 198, 190

[56] References Cited

UNITED STATES PATENTS

| | | | |
|---|---|---|---|
| 2,478,227 | 8/1949 | Bannister | 74/200 X |
| 2,734,389 | 2/1956 | Strecker | 74/200 |
| 3,513,714 | 5/1970 | Jennings et al. | 74/198 |

FOREIGN PATENTS OR APPLICATIONS

| | | | |
|---|---|---|---|
| 394,334 | 1/1909 | France | 74/200 |

*Primary Examiner*—Leonard H. Gerin
*Attorney*—Stanley Bialos and Gregg, Hendricson & Caplan

[57] ABSTRACT

A device for transmission of rotary motion by tangential tractive forces accompanying normal forces between rotating solid surfaces wherein the angular velocity ratio between input and output is controlled by varying the positional relationship between contacting surfaces. The device incorporates three main elements herein termed a "ball," a "bowl" and a "ring" therebetween. A rotary mounted bowl has a concave surface facing a convex surface of a rotary mounted ball, with a rotary mounted ring disposed between such surfaces and in contact therewith. The surfaces are urged together so that rotation of ball or bowl is transmitted by tangential tractive forces through the ring to the other. Means are provided to move the ring location for varying the points of contact of same with facing surfaces of ball and bowl to thus control the transmission ratio. The output ratio may be variable between a fraction and a multiple of the input, and input and output shafts may be disposed at the same or opposite ends of the device upon parallel, coincident or non-parallel axes.

6 Claims, 13 Drawing Figures

PATENTED JUL 4 1972

INVENTOR:
JOHN W. BURKE

BY: *Stanley Bealos*
ATTORNEY

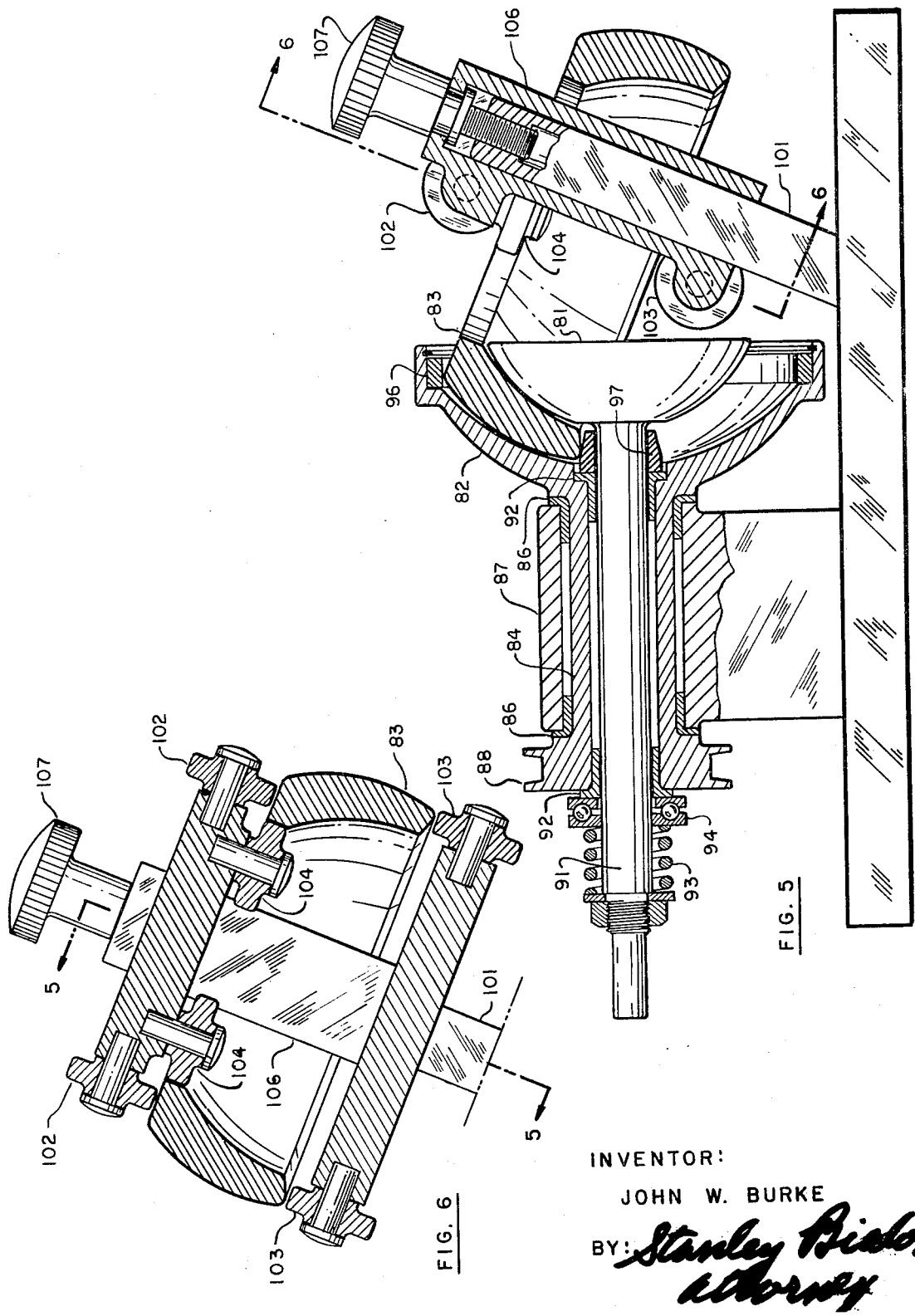

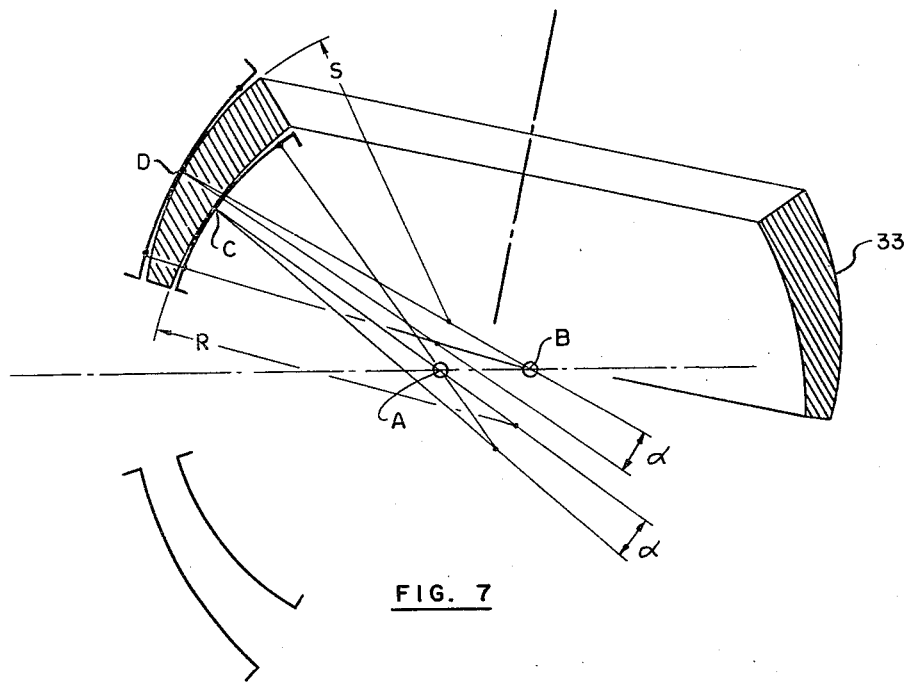
FIG. 7
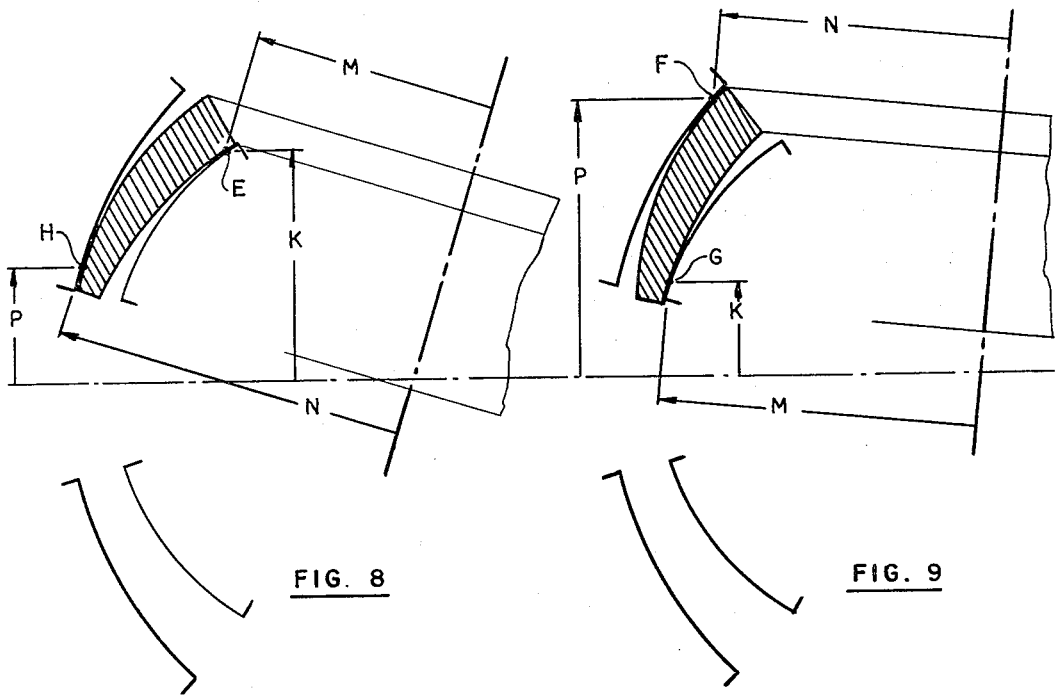
FIG. 8
FIG. 9

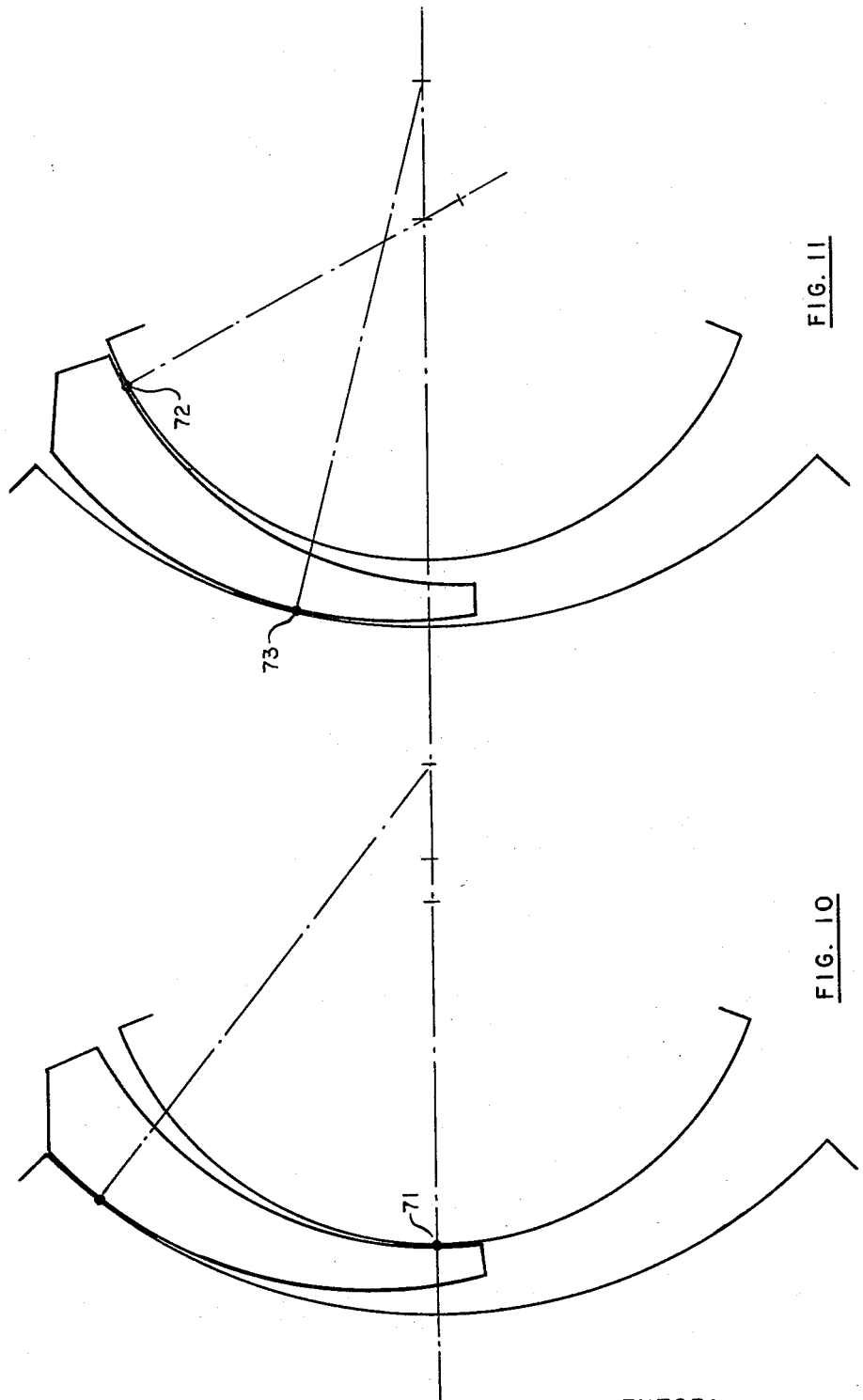

INVENTOR:
JOHN W. BURKE
BY: Stanley Bielo
attorney

VARIABLE SPEED TRACTIVE TRANSMISSION

BACKGROUND OF INVENTION

There have been developed numerous general types of variable ratio transmissions for transmitting rotary motion. One of the general types of known transmissions is the so-called tractive device wherein motor is transmitted by tangential tractive forces that are caused to accompany normal or perpendicular forces between rotating solid surfaces. Systems of this type employ various combinations of surfaces of revolution, such as, for example, the combination of a cone in a ring wherein variable ratio is obtained by translating the ring with respect to the cone while maintaining normal or perpendicular forces therebetween.

It is known that tractive transmissions may be employed in a variety of applications. However, conventional transmissions of this general type are generally limited both in the degree of ratio variation available and in the necessary location of input and output shafts. A further and major limitation upon many variable ratio tractive transmissions is the inability of same to be shifted or the ratio thereof to be changed when the parts are at rest.

Further with regard to the varying of transmission ratios in tractive transmissions, it is noted that motion is transmitted by the tangential forces accompanying normal forces generated between solid elements of particular geometry. Variable ratios are attained by translation of one element with respect to another and yet with substantial normal forces being applied between such elements, it is not usually possible to accomplish such translation unless the elements are rotating. Prior art attempts to translate a solid metallic element with respect to another when such elements at rest are maintained in forcible contact normally results in damage to the surfaces of the elements. Commercially available variable ratio tractive transmissions are generally provided with instructions that the ratios thereof are to be varied only when the transmissions are rotating. The present invention provides for successive points on one surface to translate past successive points of the mating surface during shifting so that lubrication is promoted.

The present invention provides a marked improvement in the field of variable ratio tractive transmissions by overcoming the above-noted limitations of conventional transmissions of this general type, as well as the provision of additional capabilities not heretofore available.

It is possible to tabulate the various fundamental surfaces that may be employed for tractive transmission devices. A cross tabulation of possible surface configurations results in a total of 45 possibilities wherein some 20 thereof are absurdities and another three are useful only for fixed ratio gearing. Of the remaining 22 possibilities, it is believed that three are not commercially employed other than possibly in analog computers and furthermore an additional 12 of the possibilities do not seem to have been practiced commercially. There thus remains some 10 types that have been used and wherein the degree of surface conformity differs materially.

Without extensively discussing the geometries involved with respect to possible surface conformities, it is herein briefly noted that mating surfaces of variable ratio tractive devices or transmissions may vary between double non-conforming and double conforming with the intermediate being conforming to non-conforming. In this respect the terms are employed in relationship to the relative directions of curvature of mating surfaces relative to a plane tangent to the contact point in a plane through the axes of rotation and a plane normal to the axes of rotation of the mating surfaces.

Tractive transmission devices require forces pressing the surfaces together and it is noted that under these conditions each of the mating surfaces deforms until it is in contact with the other mating surface over some finite area called the Herzian region. The shape and the size of this region and consequently the general level of stress within such region are both dependent upon the magnitude of the normal force applied between the surfaces and the component of surface curvature, i.e., whether in fact the surfaces are both non-conforming, both conforming or some intermediate thereof.

With regard to practical applications of tractive transmissions, it is noted that it is possible for the materials of the contacting surfaces to operate by dry friction but in order to achieve a satisfactory life of the surfaces at moderate to high power levels, it is advantageous to employ hardened metallic surfaces protected with a fluid lubricant. The entrainment of a lubricant in a Herzian region is accompanied by a sudden increase in the hydrostatic pressure on the fluid lubricant within the region such that the viscosity of the fluid correspondingly increases so that the lubricant then becomes a semi-solid film capable of maintaining a substantial shear stress at low rates of strain. Adhesion of the film to the two contacting surfaces with such region then effectively keys these surfaces together. It is to be appreciated that there are available commercially produced lubricants capable of permitting tractive conditions between mating surfaces of the type of transmission under consideration with a film thickness in the Herzian region sufficient to prevent metal contact and consequent wear of the mating surfaces. The stress in the Herzian region is generally in the neighborhood of 200,000 psi and lubricant film thickness may be of the order of 12 millionths of an inch.

Again considering the various possibilities of mating surfaces of tractive transmissions, it is further noted that with strongly non-conforming surfaces the foregoing stresses develop under rather modest normal forces and consequently devices employing such surfaces must be comparatively large for the amount of power that they are able to transmit. Alternatively, in strongly conforming surfaces the force necessary to produce this order of stress level will be much higher and the capacity to carry tractive loads will also be much higher with a consequent reduction in the size of the necessary device to couple substantial power.

There is provided by the present invention strongly conforming mating surfaces in a tractive transmission. Considering this point further it will be realized that a given surface velocity of the mating surfaces and a given radius of Herzian region will cause a surface point of contact between the mating surfaces to traverse the Herzian region in a set or limited time called the contact interval. Experimentation has established that there is a lower limit below which the contact interval is too short to permit full tractive conditions to develop within the region itself. Under these conditions film pressure and thickness fall quite suddenly so that a gross slippage results and metal damage follows. Comparison between conforming and non-conforming surfaces of mating surfaces of contacting elements in a tractive transmission shows a material advantage in double conforming surfaces inasmuch as the radius of the Herzian region for conforming surfaces is much larger and consequently the rotational angle subtended by the region is larger. Consequently the contact interval is larger and traction is maintained at larger surface velocities than is the case with non-conforming contacting surfaces.

There is provided in the tractive transmission of the present invention double conforming surfaces, i.e., one of two surfaces contacting at a point departs from a tangent plane in a direction toward the other surface in both a plane normal to the axes of rotation and a plane through the axes of rotation. This also applies to pairs of surfaces whose axes do not share a common plane if the degree of skew of the axes is moderate. There is achieved by the present invention a material improvement in tractive transmissions.

SUMMARY OF INVENTION

The present invention is general comprises a device for the transmission of rotary motion with a continuously variable transmission ratio by the utilization of tangential tractive forces accompanying normal or perpendicular forces between rotating solid surfaces. The transmission comprises three major elements which may be termed a "ball," a "bowl" and a "ring" for convenience of nomenclature. The ball element incorporates a convex surface of revolution about its axis of rotation, and the bowl element incorporates a concave surface of revolution about its axis of rotation with the above-noted concave and convex surfaces of ball and bowl facing each other and separated by some distance, so as to define an annular space between the two surfaces. The ball and bowl are configured such that the axial clearance between the facing surfaces increases with distance from the axis of rotation. Between the facing surfaces of ball and bowl, there is provided a ring having an interior concave surface of revolution in contact with the ball and an exterior convex surface of revolution which is in contact with the bowl. The surfaces of the ring are coaxial and usually the ring axis lies in the plane shared by the axes of the ball and bowl, but is parallel to neither of these axes.

The convex and concave surfaces of the ring have different radii of curvature, and the ring is mounted for rotation by either ball or bowl to thus transmit rotational motion to the other. Provision is also made for controllably translating the ring with respect to the ball and bowl to thus vary the location of the point of contact between ring and both ball and bowl for varying the transmission ratio of the device.

DESCRIPTION OF FIGURES

The present invention is illustrated as to particular preferred embodiments thereof and diagrams of surface configurations and relative locations in the accompanying drawings wherein:

FIG. 5 is a sectional view of an alternative embodiment of the present invention having input and output shafts extending from the same end of the device and taken in the plane 5—5 of FIG. 6;

FIG. 6 is a sectional view illustrating adjustable ring mounting in the embodiment of FIG. 5 and taken in the plane 6—6 of FIG. 5;

FIG. 7 is a diagram illustrating the relationship of surfaces of ball, bowl and ring in the embodiment of FIG. 1;

FIG. 8 is a partial illustration of the diagram of FIG. 7 but with the ring moved to provide on extreme of angular velocity ratio;

FIG. 9 is a diagram similar to FIG. 8 but with the ring moved to produce an opposite extreme of angular velocity ratio;

FIGS. 10 and 11 are diagrams illustrating an extension of the geometry of the present invention providing an output speed to zero.

DESCRIPTION OF PREFERRED EMBODIMENTS

Figure 1:
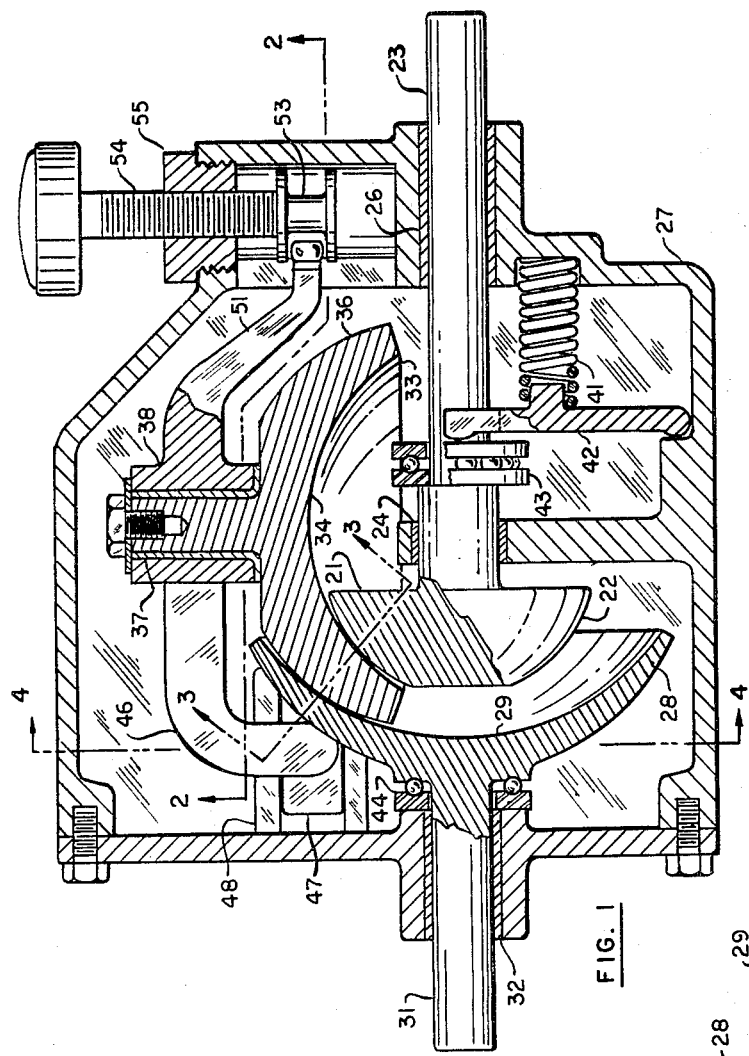
FIG. 1 is a central, sectional view through a preferred embodiment of the transmission of the present invention.
Figure 2:
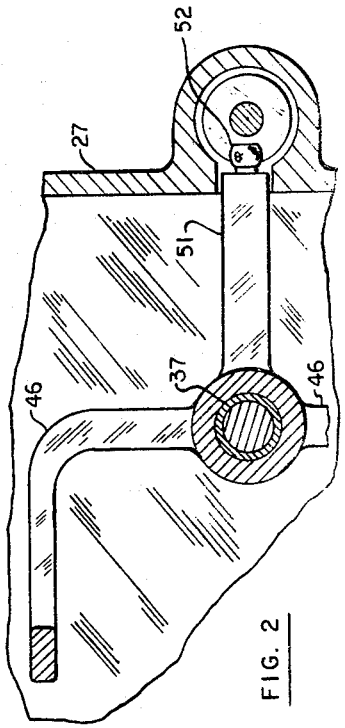
FIG. 2 is a partial sectional view taken in the plane 2—2 of FIG. 1 and illustrating ring mounting and control means.

Considering now a preferred embodiment of the present invention and referring to FIGS. 1 to 4 of the drawings, there will be seen to be provided a first element or ball 21 having a convex surface of revolution 22 about the axis thereof, and a shaft 23 extending axially of the surface 22. The ball 21 is mounted for rotation by means of bearings 24 and 26 about the shaft 23 and mounted within a housing 27. The shaft 23 extends from the housing either as an input or output shaft of the transmission. A second element or bowl 28 is formed with a concave surface of revolution 29 about an axis thereof and has a shaft or axle 31 extending axially of such surface. The bowl 28 is mounted for rotation about the axis thereof by means of a bearing 32 in the housing 27 and the shaft extends from the housing, either as an input or output shaft of the transmission. In this embodiment of the present invention, the shaft 23 and 31 of the ball and bowl 21 and 29, respectively, lie on the same axis and extend from opposite ends of the transmission housing 27.

The ball and bowl of the transmission are spaced apart with the convex ball surface 22 facing the concave bowl surface 29, and a third major element of the invention is provided as a ring 33 disposed between these surfaces. The ring 33 is provided with a concave surface of revolution 34 engaging the convex surface 22 of the ball and a convex surface 36 engaging the concave surface 29 of the bowl. The above-noted ring surfaces are generated as surfaces of revolution about the axis of the ring, and the ring is mounted for rotation about its axis as by means of an integral stub shaft extending through a bearing 37 in a yoke 38.

Transmission of rotary motion between the shafts 23 and 31 is herein accomplished by tangential forces accompanying perpendicular forces between the contacting major elements of the transmission. In order to establish these perpendicular or normal forces there is provided a thrust spring 41 compressed between the interior of the housing 27 and a thrust arm 42 having one end abutting an internal shoulder of the housing and the other end engaging a thrust bearing 43 about the shaft 23 and bearing against a shoulder thereon. This arrangement provides for urging the ball 21 to the left in FIG. 1 so as to force the ball into engagement with the ring 33. The ring in turn forcibly engages the concave surface of the bowl 28 and a thrust bearing 44 provided between the back side of the bowl and the interior of the housing.

Further with regard to physical structure of the preferred embodiment of the present invention illustrated in FIGS. 1 to 4, there will be seen to be provided means for tilting the ring 33 in the plane of FIG. 1. The yoke 38 includes a central portion through which the stem or shaft of the ring 33 extends and the ring may be maintained in the bearing 37 carried by this central portion of the yoke by means of a bolt extending through a bearing collar across the top of the yoke with the bolt threaded into the ring shaft. The yoke also incorporates a pair of lateral extensions or arms 46 extending horizontally from opposite sides of the central portion of the yoke and turned to extend in parallel relationship along opposite sides of the housing. Each yoke arm extends into pivotal engagement with a shoe 47 slidably disposed between a pair of vertically displaced horizontal rails formed on the inside of the housing. In this manner it will be seen that the yoke may be translated horizontally in the plane of FIG. 1 and also pivoted about an axis normal to the plane of FIG. 1 while also being rotatable about the ring axis. Provision is made for accomplishing desired positioning of the ring by means of a third arm 51 of the yoke extending to the right in FIG. 1 away from the arms 46 and having a small spherical or partially spherical end 52 thereon. The end 52 of the yoke arm 51 is disposed between upper and lower flanges of a spool 53 slidably disposed for vertical movement within a cylindrical bore in the housing 27. The spool is carried at the inner or lower end of a control member 54 threaded through an insert 55 secured to the housing at the top of the cylindrical bore thereof. The control member 54 may have a knob or the like at the top of same exteriorly of the housing so that the member may be rotated to thus vertically move the spool 53 and consequently to move the outer end of the yoke arm 51 up and down to consequently tilt the ring 33 for varying the transmission ratio, as described below. The yoke is prevented from rotation in the plane of FIG. 2 by engagement of the yoke arm 51 with the sides of the slot in the housing leading to the cylindrical bore in the housing 27. It is further noted that the housing may contain a lubricant or the transmission may be operated dry. It will be appreciated that physical structure of the present invention, particularly with regard to the transmission housing and the like, may be widely varied and consequently same is not extensively discussed herein.

Figure 3:
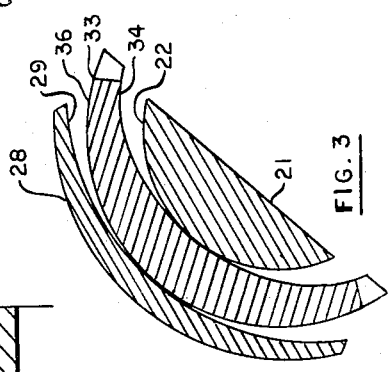
FIG. 3 is a partial sectional view taken in the plane 3—3 of FIG. 1 and illustrating engagement of ring surfaces with facing surfaces of ball and bowl.
Figure 4:
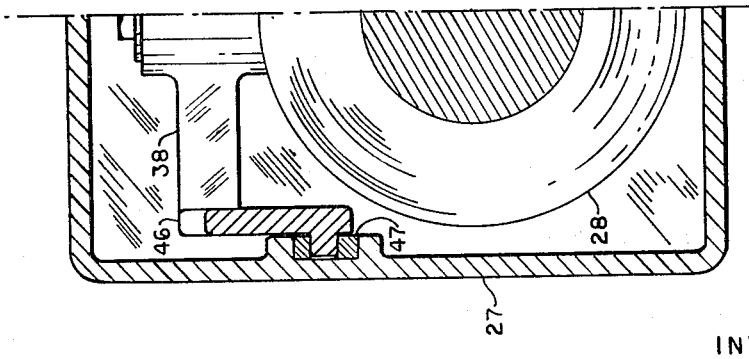
FIG. 4 is a partial sectional view taken in the plane 4—4 of FIG. 1 and further showing mounting means for the ring of the transmission.

Considering now operation of the present invention and referring to FIGS. 3 and 7 to 9, it will be seen from FIG. 3, for example, that contact between the ball and ring and between the ring and bowl is limited to a small area that may be thought of as circular but which in practice may be oblong or oval shaped. It is to be appreciated that pure rolling contact between contacting surfaces hereof will only occur at one point in or near the area over which these surfaces are in contact under load. At all other points within the area, surface velocity vectors of points in contact do not coincide and a condition known as spinning or boring results. It is well established that net tractive effort in a direction beneficial to a torsional driving effect can be obtained under these conditions. In order to discuss geometry of the present invention, it is convenient to consider contact between engaging surfaces as being a point contact and referring to FIG. 7 in this respect it will be seen that there is illustrated a simple geometric representation of a ball, a bowl and a ring in tractive contact. Although there is a wide variety of surface forms and alignments useful in the present invention, the illustration of FIG. 7 illustrates the ball and bowl as having spherical surfaces with centers A and B lying on a common axis. The surfaces of the ring 33 in the illustration of FIG. 7 are shown as circular segments of radii R and S. The contact between ball and ring occurs at a point C and between bowl and ring occurs at a point D. It will be seen that the inner concave surface of the ring has the center of the radius R thereof lying on an extension of the ray AC and the outer convex surface of the ring has the center of the radius lying on the ray BD. It will be appreciated that rotation of the ball, for example, which is pressed into tight contact with the ring at the point C will cause the ring to rotate at an angular velocity determined by the ratio of the radius of the ball to point C divided by the radius of the ring to point C. The ring is also maintained in forcible contact with the bowl at point D and thus rotation of the ring causes the bowl to rotate at an angular velocity determined by the ratio of the radius of the ring to point D divided by the radius of the bowl to point D.

The present invention provides for tilting of the ring 33 so as to vary the points of contact thereof with the bowl and ball and thus to controllably vary the ratio of angular velocities of bowl and ball. Tilting of the ring through an angle $\alpha$ in a clockwise direction from the intermediate position shown in a combination of rolling and sliding contact with the ball and bowl causes the points of contact to move until the positions H and E are reached. Referring now to FIG. 8, there will be seen to be illustrated in part the geometry for this extreme tilted position of the ring. In this position of the transmission the ring contacts the ball at a ball radius of K and a ring radius of M. The radius of the ring at the contact point with the bowl is denominated as N and the radius of the bowl at such contact as P. The transmission ratio or ratio of angular velocity of the ball to the bowl is given by the relationship $$\frac{\text{angular velocity (ball)}}{\text{angular velocity (bowl)}} = \frac{M}{K} \div \frac{N}{P} \text{ or } \frac{M}{K} \times \frac{P}{N}$$

Purely as an example, consider a ball having a convex operating surface with the radius of curvature of 3¾ inches and a bowl having a concave operating surface with a radius of curvature of 5½ inches. The above-noted ball, bowl and ring radii at points of contact may then for the illustration of FIG. 8 have the dimensions K = 3, M = 3.8, N = 4.9 and P = 1.8. Substituting in the above-noted relationship then provides a transmission ratio of 0.46. This ratio may be varied by tilting the ring in the plane of FIG. 1 of the drawing as, for example, to an opposite extreme position of contact G and F, as illustrated in FIG. 9. In this position and assuming the same exemplary transmission dimensions as noted above, the radii at contacting points may be K = 1.5, M = 4.4, N = 4.5 and P = 3.8. This then produces a transmission ratio of 2.5. It will be seen then than this embodiment of the present invention may provide a ratio variation from a fraction to a multiple.

It has been noted that the ring or intermediate member of the transmission of the present invention is constrained to move only in certain ways. Thus the ring is mounted for rotation about the axis thereof and this occurs through the generation of tractive forces accompanying normal forces between the elements of the transmission. In addition, the ring is adapted for controllable movement or tilting in a plane containing the axis of the ring and the axes of the ball and bowl. Such controlled movement of the ring is provided for the purpose of varying the transmission ratio and is accomplished by actuation of the control means 54. The yoke 38 carrying the ring 33 is controllably tilted by rotating the threaded shaft of the control means to raise or lower the yoke 51. The yoke arm 51 fitting in the housing slot and the other two yoke arms 46 prevent any possible rotation or twisting of the yoke in any other plane. It will be appreciated that as the yoke arm 51 is raised to tilt the ring the other yoke arms 46 will necessarily translate in planes parallel to the plane of FIG. 1 and such is herein accommodated by the shoe 47 disposed between the rails 48 at the end of each of such yoke arms. Clearance between the ball and bowl is not constant but changes with variation of ring position. Clearance is generally a minimum in the midrange position shown in FIG. 7 and increases as extremes of either FIGS. 8 or 9 are assumed. It is to be appreciated that alternative structure may be provided for tilting the ring to vary the transmission ratio; however, it is required that any such structure limit movement of the ring to the degrees of motion identified above.

In the foregoing description of the preferred embodiment of the present invention and geometry associated therewith, certain working surfaces have been identified as being either concave or convex. It will be noted that engaging surfaces are formed of one convex and one concave surface. In each of these pairs, however, it is particularly noted that the surfaces may be generated by other than circular lines rotated about an axis. Thus, for example, the surface forms may be generated by non-circular curves or blends of radii of curvature and furthermore conical surfaces may be employed as concave when used in contact with non-conical convex surfaces or as convex surfaces when used in contact with non-conical concave surfaces.

The geometry of the invention illustrated in FIGS. 7 to 9 and described above provides a transmission ratio between a fraction and a multiple; however, the geometry may be extended to provide a ratio between zero and a multiple, for example. In this respect reference is made to FIGS. 10 and 11 illustrating a configuration of ring with ball and bowl wherein the ring extends in one extreme position to a point of contact with the ball, for example, on the axis of the ball as illustrated at 71 of FIG. 10. It will be appreciated that with the ball rotated in contact with the ring at point 71 there will be no tangential tractive forces applied to the ring in a direction to rotate same about its axis. Consequently no motion will be transmitted through the ring to the bowl and thus there is achieved what may be termed a zero transmission ratio. Tilting of the ring in the plane of the illustration of FIG. 10 to the position shown in FIG. 11, for example, causes the point of contact between ball and ring to move to a point 72 substantially displaced radially from the axis of the ball. The convex side of the ring at the same time moves its point of contact with the bowl to a point 73 such that a transmission ratio greater than zero is achieved.

Figure 13:
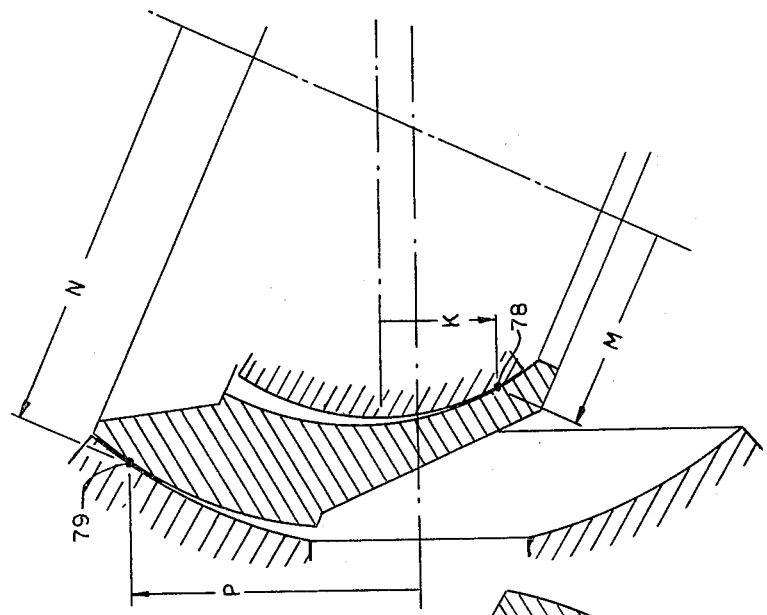
FIGS. 12 and 13 are diagrams illustrating a further extension of the geometry to provide an output speed through zero to an appreciable value in the reverse direction from the input.
Figure 12:
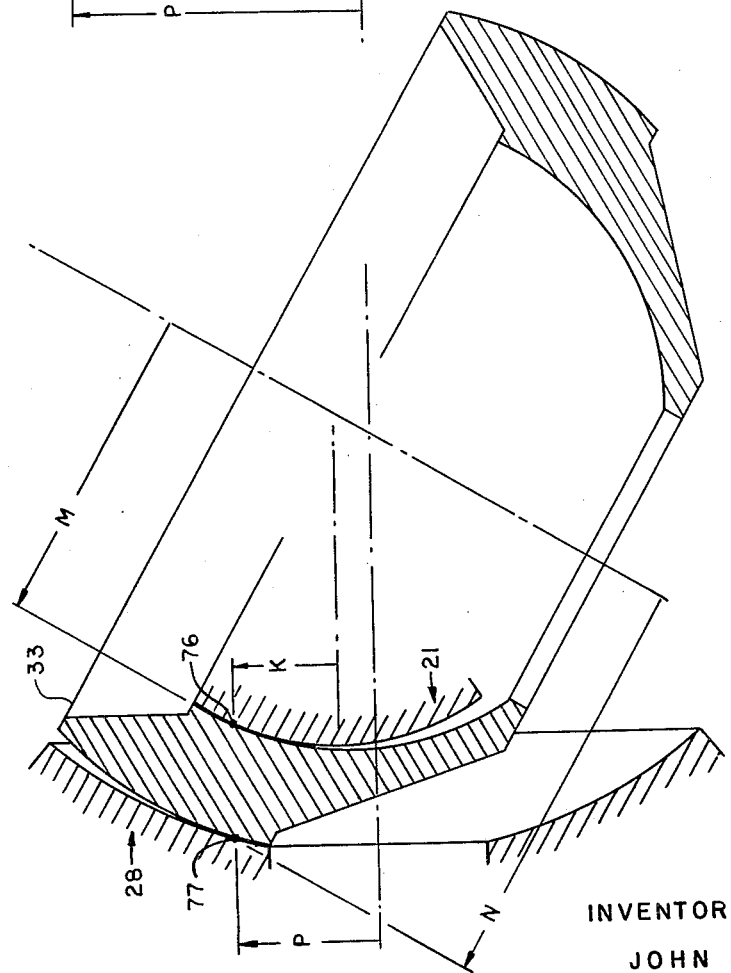

Even greater variation in transmission ratio may be achieved by provision of a ring element so configured and disposed as to be capable of movement to vary the point of contact between ring and ball, for example, between a point above the axis of the ball and a point below the axis. This is illustrated in FIGS. 12 and 13 wherein the ball, bowl and ring are provided with the same numerals as in FIG. 1. It will be seen that the ring is provided with a substantially different curvature on the inner or ball side from the curvature on the outer or bowl side and furthermore that the portion of the exterior of the ring may be cut away as it is only necessary that the exterior convex surface of revolution be sufficiently extensive to engage the bowl over the degree of movement of the ring. In this illustration it is also noted that the center of the bowl may also be removed inasmuch as the ring does not engage the center. The same conventions are employed in FIGS. 12 and 13 as in FIGS. 8 and 9 as to radii of interest. It is furthermore noted that the axes of ball and bowl are not coincident but instead are disposed parallel to each other in spaced relation. FIG. 10 illustrates the ring 33 in what may be termed one extreme position wherein the concave surface of the ring engages or contacts the convex surface of the ball at the point 76 located at a radius K of the ball from the axis thereof. The convex surface of the ring 33 engages the concave surface of the ball 28 at a point 77 which is located at a radius P of the bowl about the axis thereof. It is to be noted that both of the contact points 76 and 77 are above the axes of ball and bowl in this position of the ring. Adjustment of the ring to tilt same in the plane of the illustration may be carried to an extent such as illustrated in FIG. 13 wherein the ball engages the ring at a point 78 below the ball axis at a radius K. The ring engages the bowl at a point 79 on the same side of the bowl axis as before but at an increased radius P of the bowl. Transmission ratios of the angular velocity of the bowl with respect to the ball may, for example, be of a variable between 0.97 forward to 1.06 reverse in the illustration of FIGS. 12 and 13. It is to be appreciated that as a contact between the ball and ring moves one side of the ball axis to the other while the ring and bowl contact remain on the same side of the bowl axis, there is produced a reverse direction of rotation of the bowl with respect to the ball or vice versa. Thus it will be seen that the geometry of FIGS. 12 and 13 do provide for a transmission ratio that varies from a fraction or multiple through zero to a fraction or multiple in the reverse direction.

There has been described above the present invention with respect to the preferred embodiment thereof illustrated in FIGS. 1 to 4 and a description of the fundamental geometry of the present invention as exemplified by various positions and configurations in FIGS. 7 to 13. An alternative embodiment of the invention as illustrated in FIGS. 5 and 6 wherein ball and bowl shafts extend from the same end of the device. Considering now the embodiment of FIGS. 5 and 6 there will be seen to be provided a ball 81 having a convex surface facing a concave surface of a bowl 82 and spaced therefrom. A ring or intermediate element 83 is disposed in the space between the ball and bowl and provision is made for forcibly engaging the ball and ring and ring and bowl. The bowl 82 has a cylindrical extension 84 extending from the rear thereof and carried by bearings 86 in a housing 87 for free rotation therein. The rear or outer end of the cylinder 84 may be formed as or connected to a pulley wheel 88 about which a pulley is adapted to be connected for the transmission of rotary motion either to or from the bowl through the cylinder.

The ball 81 is mounted upon an axial shaft 91 extending from the center of the convex surface of the ball through the center of the cylinder 84 and mounted in rotatable relationship thereto by bearings 92. Provision is made for urging the ball and bowl together against the ring and such is shown in FIG. 5 to include a compression spring 93 disposed between a thrust bearing 94 against the cylinder 84 and a collar about the ball shaft 91.

With regard to the ring or intermediate member of the transmission it will be seen that same is provided with a concave inner surface for engagement with the convex surface of the ball and with a convex outer surface for engagement with the concave surface of the bowl. An outer slip ring 96 is carried in an extension of the bowl at the outer extremity of the working surface thereof and an inner slip ring 97 is disposed about the ball shaft 91 with the ring then being restrained by these two rotatably mounted slip rings so that the ring is restrained from substantial translation axially thereof.

Although it may be possible to mount the ring by a variety of means, the system employed in the embodiment of FIGS. 5 and 6 includes an inclined support 101 extending upwardly from the base of the housing 87. The ring 83 is mounted without an axle or axial shaft as such but instead is mounted for rotation by means of a first pair of rollers 102 disposed atop the ring on opposite sides thereof, a second pair of rollers 103 disposed on the underside of the ring with one on each side of the ring and a third pair of rollers 104 disposed within the ring engaging opposite sides thereof. The pairs of rollers 102, 103 and 104 are mounted upon a slide member 106 slidably engaging the inclined support member 101 of the housing and adjusting means 107 engaging the slide at the top and extending into fitted contact with the support member 101 so that rotation of the knob at the end of the adjusting means raises or lowers the slide of the support. In the example of FIG. 5 the pairs of rollers 102, 103 and 104 contact the ring at points all lying in a single plane containing the axis of the ring, although this is not a necessary requirement. The slide 106 is movable on the support 101 to thus consequently move the center of the ring upwardly or downwardly at an angle to the axis of the ball and bowl of the transmission. As noted above the inner and outer slip rings 97 and 98 prevent the ring from substantial translation axially thereof and consequently the slide will thus be seen to be operable to pivot the ring in the plane of the illustration of FIG. 5. This then serves to adjustably control or vary the points of contact between the ring and ball and between the ring and bowl. It will, of course, be appreciated that the pairs of rollers identified above and illustrated in the drawings are appropriately mounted upon the guide or brackets extending therefrom for free rotation and the first and second pairs of rollers 102 and 103 prevent rotation of the ring axis about the ball and bowl axis while the third set of rollers 104 bearing upon the interior of the ring prevent ring movement perpendicular to the plane of the illustration of FIG. 5. It is to be noted that, inasmuch as the slide 106 moves in a straight line, clearance between the rollers 102 and 103 on one side of the ring must be somewhat greater than the thickness of the ring; however, this deviation from an ideal situation is not a material detriment to the invention.

There have been described above particular preferred embodiments of the present invention together with a theoretical discussion of the geometry of the invention. It is particularly noted that variations in the physical configuration of particular portions of the present invention are possible within the proper scope of the invention. It is furthermore noted that the terms concave and convex as employed herein with respect to particular surfaces of the three major elements of the transmission, are to be taken in the context of the invention as described above. Thus, for example, a concave surface may, in fact, be conical when it is in engagement with a convex surface and furthermore the terms convex and concave may, in fact, encompass surfaces having multiple radii of curvature rather than being limited to spherical surfaces.

What is claimed is:

1. A variable speed transmission device comprising rotatably mounted first and second members having facing convex and concave surfaces of revolution respectively, a rotatably mounted ring disposed between said first and second members with said ring having a concave surface engaging the convex surface of said first member and a convex surface engaging the concave surface of said second member, means urging said members into contact with said ring, whereby rotation of one of said members rotates the other member through said ring, and means controllably tilting said ring to vary the locations of the points of contact between ring and members to vary the transmission ratio of the device.

2. The device of claim 1 further defined by said first and second members each having a shaft extending therefrom on the axes of said surfaces of revolution and the means tilting said ring operating to move the ring only in a plane containing the axes of the surfaces of revolution of said first and second members.

3. The device of claim 2 further defined by said shafts having a common axis and extending in opposite directions from each other.

4. The device of claim 2 further defined by said shafts being concentric with one disposed about the other in extension from the same end of the device.

5. The device of claim 1 further defined by the centers of curvature of said convex and concave surfaces of said first and second members lying at spaced points on the common axis of said members and the radii of curvature of such surfaces being different to define an opening between said members that increases away from said axis.

6. The device of claim 1 further defined by the means rotatably mounting and controllably tilting said ring comprising a yoke engaging said ring about an axial shaft thereof, said yoke having at least one arm extending into engagement with a transmission housing for translation only in a plane parallel to a first plane through the axes of said first and second members, said yoke also having a further arm extending in said first plane into engagement with control means translating said further arm in said first plane normal to the axes of said elements.

* * * * *